J. SWART.
Shovel Plow.
No. 41,728.
Patented Feb. 23, 1864.
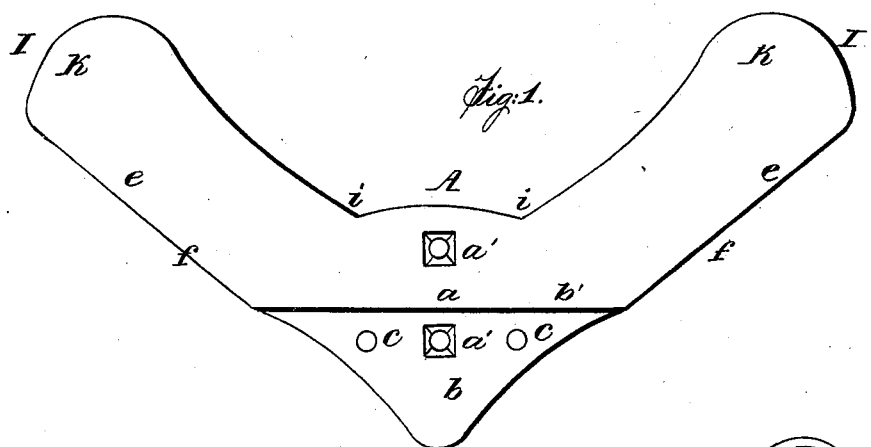
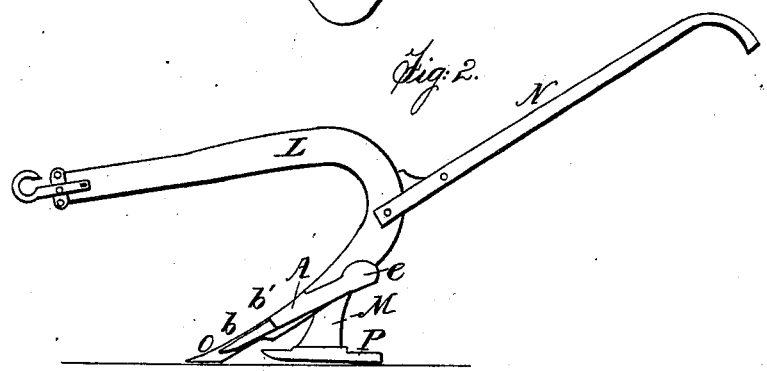
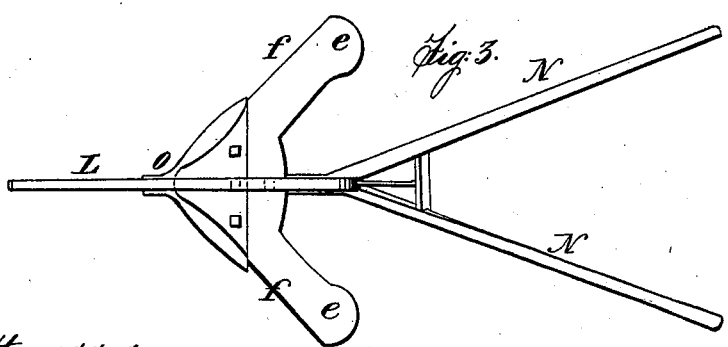
Witnesses,
Charles D Smith
Charles DuBois
Inventor,
James Swart

UNITED STATES PATENT OFFICE.

JAMES SWART, OF HOFFMAN'S FERRY, NEW YORK.

IMPROVEMENT IN CULTIVATORS.

Specification forming part of Letters Patent No. 41,728, dated February 23, 1864.

*To all whom it may concern:*

Be it known that I, JAMES SWART, of Hoffman's Ferry, in the county of Schenectady and State of New York, have invented a certain new and useful Improvement in Shovel-Plows; and I do hereby declare the following to be a full and exact description of the same, reference being had to the accompanying drawings, making part of this specification, in which—

Figure 1 is a plan of my improved mold-board. Fig. 2 is a side elevation of a plow with the mold-board applied. Fig. 3 is a top view of the same.

Similar letters of reference indicate corresponding parts in the several views.

My invention relates to an improved construction of mold-board applicable to plows having curved beams and others of analogous construction.

In order that others skilled in the art to which my invention appertains may be enabled to fully understand and use the same, I will proceed to describe its construction and operation.

A represents my improved mold-board, provided in its central part, $a$, with countersunk apertures $a'$ $a'$ for the reception of bolts for attaching it to the beam or standard, and a recess or depression, $b$, and shoulder $b'$ for the reception of the share, and two bolt-holes, $c c$, for the attachment thereof in customary manner. The wings $e$ $e$ are of peculiar form, straight, or nearly so, at their lower edges, as shown at $f f$, and on their upper edges formed with gradually-expanding curves toward their outer ends, $g$ $g$, which are made round without any sharp or prominent angles, in order to avoid danger of cutting or wounding the plants. Each wing, from the point $i$, at which it joins the central part, $a$, to its outer end, $g$, is made of a length equal to about double its width, and the surface of each wing is made flat with a slight depression at $k$ to cause the earth to be thrown more effectually toward the rows of plants. The mold-board is mounted upon its standard in such a position that when in use its lower edges will incline upward at angles of about fifteen degrees. The lower edges of the mold-board, being thus nearly horizontal, operate more effectually to cut and elevate the earth, which then passing upward and outward on the wing, a portion of it flows over the recesses $i$ $i$, and is delivered in a loose state into the furrow behind the plow, while the remainder is cast well over against both rows of plants.

The beam L, standard M, handles N N, share O, and shoe P (indicated by red lines in the drawings) may be of any suitable construction, and do not need specific description here.

The implement above described accomplishes the work more effectually and with a less expenditure of power than those previously in use. The nearly horizontal lower edges of the mold-board cut and raise the earth across the entire breadth of the plow without packing or compressing it in the bottom of the furrow and leave the ground in a loose condition well adapted for the penetration of moisture. The form of the mold-board also adapts it to more effectually cast the earth laterally against the plants without necessitating the use of a mold-board of so great vertical height.

Having thus described my invention, what I claim as new therein, and desire to secure by Letters Patent, is—

The mold-board A, constructed with flat-faced wings $e$ $e$, narrow at the base and wider toward their ends, having straight lower edges, $f f$, and rounded outer ends, $g$ $g$, all as herein shown and explained, and for the purposes specified.

JAMES SWART.

Witnesses:
CHARLES D. SMITH,
EDM. F. BROWN.